United States Patent [19]

Schmidt et al.

[11] 4,200,255
[45] Apr. 29, 1980

[54] FOLDABLE BOOM ASSEMBLY

[75] Inventors: Donald K. Schmidt; Patrick Kuhn, both of Bismarck, N. Dak.

[73] Assignee: Clark Equipment Company, Buchanan, Mich.

[21] Appl. No.: 934,295

[22] Filed: Aug. 17, 1978

[51] Int. Cl.² ............................................. A01C 25/62
[52] U.S. Cl. ............................... 248/289 A; 239/167; 403/160
[58] Field of Search ............... 280/473, 656; 239/159, 239/163–169; 403/160, 161, 164; 16/135, 141; 172/311; 248/665, 475 B, 145, 289 A; 52/111

[56] References Cited

FOREIGN PATENT DOCUMENTS 145529  1/1951 Australia .................................. 239/168
154595  4/1953 Australia .................................. 239/168

OTHER PUBLICATIONS

S-900Z Kn-20M-4-77, "Melroe Spra-Coupe," Product of Clarke Equipment Co., Bismarck, North Dakota, 58501.

Primary Examiner—Andres Kashnikow
Attorney, Agent, or Firm—Mack L. Thomas

[57] ABSTRACT

A vehicle and foldable boom assembly includes an inner boom that extends outwardly from a side of the vehicle and an outer boom that extends outwardly from the inner boom to a working position. A hinge, having a pivot axis that is disposed generally vertically, interconnects the inner and outer booms and allows the outer boom to swing rearwardly to avoid structural damage upon impact with a foreign object; and the pivot axis is inclined in a direction that resiliently urges the outer boom forwardly to the working position so that the outer boom is automatically reset to the working position subsequent to impact with a foreign object.

16 Claims, 5 Drawing Figures

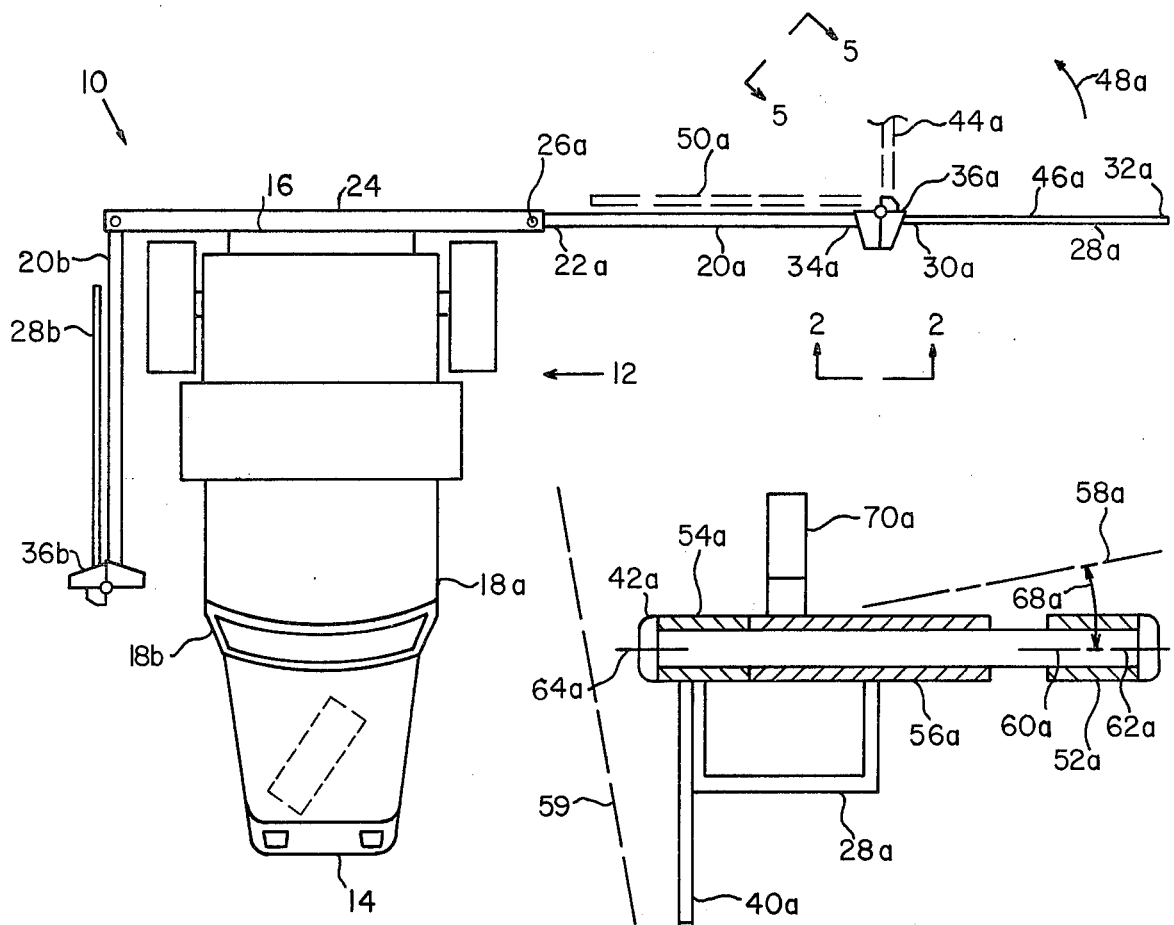
FIG. 1
FIG. 4
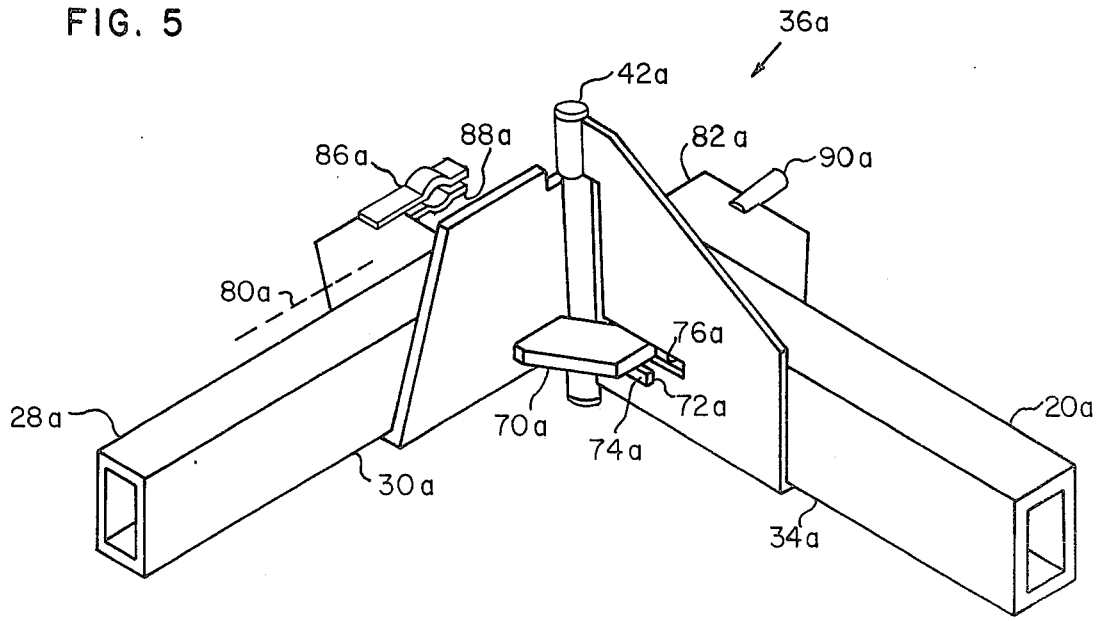
FIG. 5

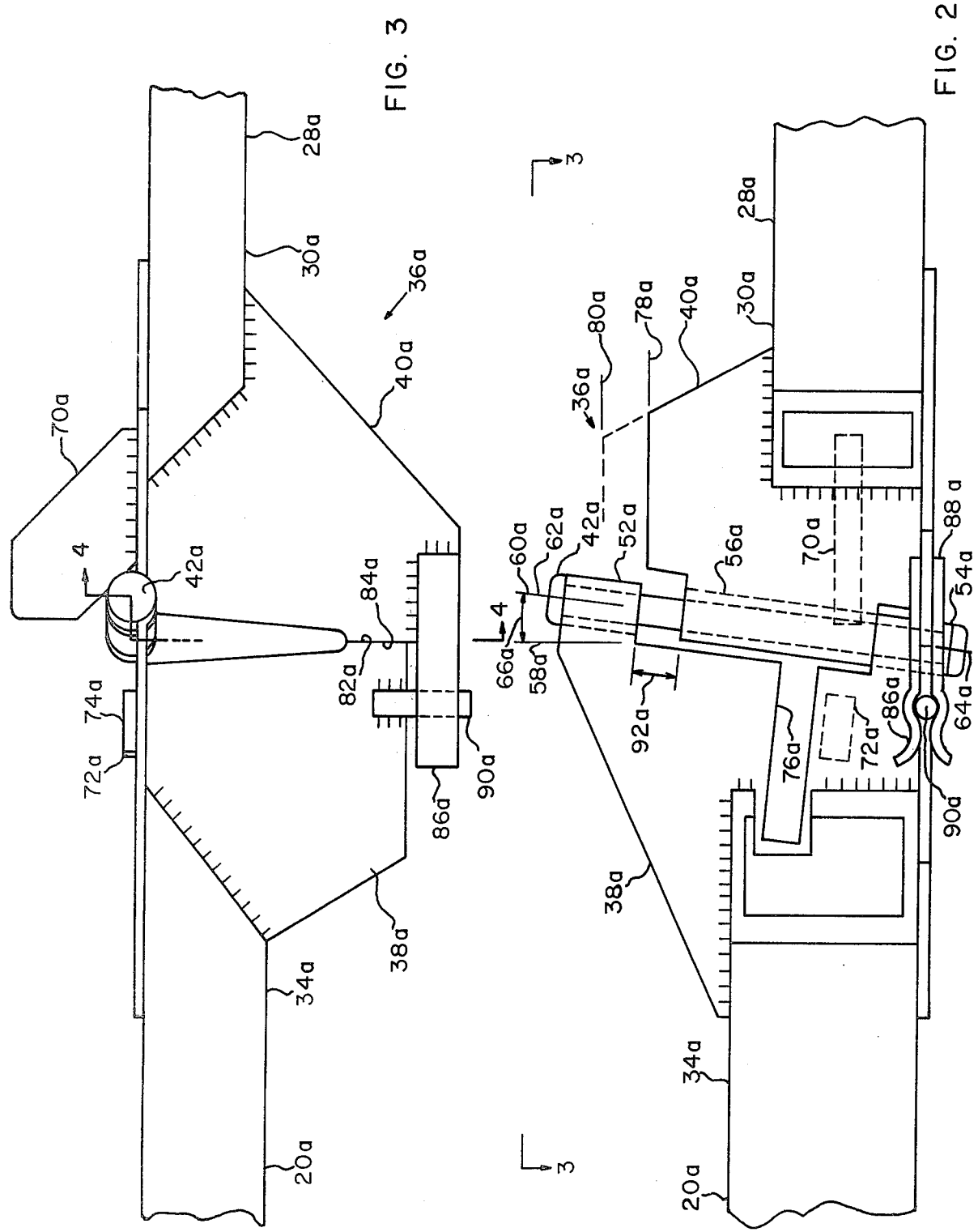

FOLDABLE BOOM ASSEMBLY

BACKGROUND OF THE INVENTION

1. Field of the Invention

The present invention relates generally to vehicle and boom assemblies of the type having a jointed and foldable boom, and more particularly to agricultural spray vehicles.

2. Description of the Prior Art

Vehicles having inner and outer booms have been used in the agricultural industry for spraying fertilizers, insecticides, and herbicides.

The prior art has included vehicle and boom assemblies in which an inner boom is pivotally attached to the vehicle and is pivotal forwardly into substantially parallel disposition with a side of the vehicle for transport and is pivotal rearwardly to an outward or working position.

An outer boom is pivotally attached to the inner boom and is detented in an outward or working position, and is rotatable rearwardly, whereby the outer boom is protected from structural damage that could occur from accidental impact with such objects as fences, and whereby the outer boom may be folded against the inner boom for transport.

In the prior art, it has been necessary for the operator of the vehicle to stop the vehicle, dismount from the vehicle, and manually swing the outer boom back into the outward position and into yieldable engagement with the detent, after impact with a foreign object.

SUMMARY OF THE INVENTION

A vehicle and foldable boom assembly includes an inner boom having a first end that is attached to the vehicle and having a second end that is extendable outwardly with respect to a side of the vehicle, and an outer boom having an inner end that is disposed proximal to the second end of the inner boom and having an outer end. A hinge includes an inner half that is attached to the inner boom proximal to the second end, and an outer half that is attached to the outer boom proximal to the inner end. A hinge pin is disposed generally vertically and pivotally connects the hinge halves whereby the outer boom is pivotal about a generally vertical pivot axis.

A first stop is provided for preventing the outer boom from pivoting forwardly beyond an outward or working position; and a second stop is provided for preventing the outer boom from pivoting rearwardly beyond a second position. The hinge pin is sloped forwardly, outwardly, or at an angle that includes both forward and outward sloping, so that the outer boom raises as the outer boom swings rearwardly. Thus the outer boom is resiliently urged forwardly by the inclination of the hinge pin and the raising of the outer boom against gravity as the outer boom swings rearwardly.

The outer half of the hinge is raisable vertically to a position wherein the functioning of the second stop is obviated; and wherein the outer boom may be folded substantially 180° into substantially parallel disposition with the inner boom to a third or transport position for transporting between fields.

The present invention provides a simple, economical, and maintenance free hinge mechanism for providing breakaway action of an outer boom of a spray vehicle, and for providing automatic resetting of the outer boom to the working position after impact with an object and breakaway of the outer boom. The present invention also provides a hinge having a stop position which may be obviated by raising one-half of the hinge.

These and other features and advantages of the present invention will be readily apparent when referring to the following detailed description wherein:

BRIEF DESCRIPTION OF THE DRAWINGS

FIG. 1 is a top view of the vehicle and foldable boom assembly of the present invention;

FIG. 2 is a front elevation of the hinge assembly that connects the inner and outer booms, taken substantially as shown by view line 2—2 of FIG. 1, but taken at an inclination with a ground plane and a vertical axis as shown by a view line 2—2 of FIG. 4, and showing the hinge pin sloped outwardly.

FIG. 3 is a top view of the hinge assembly of FIG. 2, taken substantially as shown by view line 3—3 of FIG. 2;

FIG. 4 is a cross-sectioned end view of the hinge of FIG. 2, taken substantially as shown by section line 4—4 of FIG. 2, and showing the hinge pin sloped forwardly; and FIG. 5 is an oblique rear view of the hinge assembly of the present invention, taken substantially as shown by view line 5—5 of FIG. 1, and showing the outer half of the hinge raised to a position wherein the stop portion of one hinge half is received into a slot in the other hinge half thereby obviating the function of the stop portion.

PREFERRED EMBODIMENT

Referring now to FIG. 1, a vehicle and foldable boom assembly 10 includes a vehicle 12 having a front end 14, rear end 16, and sides 18a and 18b. An inner boom 20a includes a first end 22a that is pivotally connected to a support structure 24 by a vertically disposed pivot pin 26a. An outer boom 28a includes an inner end 30a and an outer end 32a. The inner end 30a of the outer boom 28a is pivotally connected to a second end 34a of the inner boom 20a by a hinge 36a. Referring now to FIGS. 1 and 2, the hinge 36a includes an inner half 38a that is connected to the second end 34a of the inner boom 20a, an outer half 40a that is connected to the inner end 30a of the outer boom 28a, and a hinge pin 42a that interconnects the hinge halves 38a and 40a, that is disposed generally vertically, and that allows the outer boom 28a to swing in a plane that is generally horizontal.

Referring again to FIG. 1, in like manner, the vehicle and foldable boom assembly 10 includes an inner boom 20b, an outer boom 28b, and a hinge 36b. The inner and outer booms, 20a and 28a, are shown disposed outwardly from the side 18a of the vehicle 12 of working positions; and the inner and outer booms, 20b and 28b, are shown folded to transport positions.

The present invention relates primarily to the construction of the hinge 36a which includes: urging means for resiliently returning the outer boom 28a from a second or breakaway position 44a to an outward or working position 46a, stopping means for stopping rotation of the outer boom 28a in a rearward direction 48a to the second position 44a, and means for obviating the stopping means so that the outer boom 28a may be rotated substantially 180° from the outward position 46a to a third or transport position 50a.

The inner boom 20b, the outer boom 28b, and the hinge 36b are similar to the inner boom 20a, the outer boom 28a, and the hinge 36a, the like-named parts varying only as required for mounting on opposite sides of the vehicle 12. Thus the description of the parts on one side of the vehicle will suffice for both.

Referring now to FIGS. 2-4, the inner boom 20a is shown as a rectangular piece of tubing with the second end 34a thereof welded to the inner half 38a of the hinge 36a. In like manner, the outer boom 28a is shown as a rectangular piece of tubing with the inner end 30a thereof welded to the outer half 40a of the hinge 36a.

The inner half 38a of the hinge 36a includes spaced-apart pin bushings 52a and 54a; and the outer half 40a includes a pin bushing 56a. The hinge pin 42a is inserted through the pin bushings 52a, 56a, and 54a; and the pin bushing 56a is shorter than the space between the pin bushings 52a and 54a so that the outer half 40a and the outer boom 28a may be raised vertically.

The hinge pin 42a is disposed generally vertically as shown by a vertical axis 58a in FIGS. 2 and 4 and a ground plane 59 in FIG. 4; but the hinge pin 42a is inclined outwardly as shown in FIG. 2 and forwardly as shown in FIG. 4. That is, the hinge pin 42a defines a pivot axis 60a that includes an upper portion 62a and a lower portion 64a. The upper portion 62a of the pivot axis 60a is sloped outwardly at an angle 66a which may be up to at least fifteen degrees and the upper portion 62a is sloped forwardly at an angle 68a which may be up to at least fifteen degrees.

Referring now to FIGS. 1-4, it can be visualized that sloping of the pivot axis 60a outwardly at the angle 66a would resiliently return the outer boom 28a either from the second position 44a or the transport position 50a to the outward position 46a; because the sloping of the pivot axis 60a outwardly at the angle 66a causes the outer boom 28a to raise as the outer boom 28a is rotated rearwardly to the second position 44a and on to the transport position 50a. In like manner, inclining the pivot axis 60a forwardly at the angle 68a is effective to resiliently urge the outer boom 28a from the second position 44a to the outward position 46a; because sloping of the pivot axis 60a forwardly at the angle 68a is effective to cause the outer boom 28a to raise as the outer boom 28a rotates rearwardly from the outward position 46a to the second position 44a.

Thus it can be seen that the pivot axis 60a can be inclined forwardly, outwardly, or at an angle which is a combination of forward and outward inclinations to cooperate with the weight of the outer boom 28a and thereby to provide a means for resiliently urging the outer boom 28a from the second position 44a to the outward position 46a.

If the pivot axis 60a is inclined only forwardly, as shown by the angle 68a, then it is necessary to provide a stop which limits rearward movement of the boom 28a to the second position 44a; since further rearward rotation of the outer boom 28a would result in the outer boom 28a passing the point of maximum height and a reversal in the gravity imparted rotational force that is a function of the inclination of the pivot axis 60a. However, if the pivot axis 60a is inclined only outwardly, as indicated by the angle 66a, it is not necessary to provide a stop at the second position 44a; since the outer boom 28a continues to raise as the outer boom 28a rotates from the second position 44a to the transport position 50a.

In like manner, if the pivot axis 60a includes both an outward inclination at the angle 66a and a rearward inclination at the angle 68a, a stop will be required at some point intermediate of the second position 44a and the transport position 50a, depending upon the combined angle of the angles 66a and 68a.

Referring now to FIGS. 2-5, the hinge 36a includes a stop portion 70a which is welded to the outer half 40a, and a stop button 72a which includes a stop surface 74a and which is welded to the inner half 38a. Preferably, the stop portion 70a contacts the stop surface 74a when the outer boom 28a has rotated approximately 90° to the second position 44a.

The inner half 38a of the hinge 36a includes hole means or slot 76a which is disposed above the stop portion 70a. When the outer boom 28a and the outer half 40a of the hinge 36a are raised from a lower or gravity position 78a as shown in FIG. 2 to an upper position 80a as shown in FIG. 5, the stop portion 70a misses the stop surface 74a, and instead, is received into the slot 76a so that action of the stop means, which comprises the stop portion 70a and the stop surface 74a, is obviated; and the outer boom 28a is rotatable substantially 180° from the outward position 46a to the transport position 50a.

Referring now to FIGS. 2 and 3, the hinge 36a also includes another stop means, which comprises first and second contacting surfaces, 82a and 84a, which are included on respective ones of the inner and outer halves, 38a and 40a.

The hinge 36a also includes detent means, which comprises spring clips 86a and 88a which are secured to the outer half 40a and the latch rod 90a which is secured to the inner half 38a, for resiliently retaining the outer boom 28a in the outward position 46a.

In summary, the inclination of the hinge pin 42a and the pivot axis 60a thereof to the forwardly inclined angle 68a, to the outwardly inclined angle 66a or to both angles 66a and 68a, provides an urging means for resiliently urging the outer boom 28a toward the outwrd position 46a. This inclination of the hinge pin 42a and the pivot axis 60a thereof from a vertical axis 58a provides this urging means by raising the outer boom 28a against the force of gravity acting upon the weight of the outer boom 28a; so that this inclination of the pivot axis 60a also provides raising means for raising the outer boom 28a as the outer boom 28a moves rearwardly from the outward position 46a to the second position 44a whereby gravity resiliently urges the outer boom 28a toward the outward position 46a.

The hinge 36a includes a stop means which comprises the stop portion 70a and the stop surface 74a; and this stop means may be obviated by an obviating means which includes the hole means or slot 76a, and a clearance 92a that is intermediate of the pin bushings 52a and 56a and that allows the outer half 40a of the hinge 36a to move from the lower or gravity position 78a to the upper position 80a wherein the stop portion 70a is received into the hole means or slot 76a.

Thus the hinge 36a cooperates with the vehicle 12, the inner boom 20a, and the outer boom 28a, to provide a vehicle and foldable boom assembly 10 in which the outer boom 28a folds to a breakaway position 44a to avoid damage from impact from a foreign object (not shown), in which the outer boom 28a is automatically returned to the outward position 46a to continue field operation without manually repositioning the outer boom 28a, and in which a stop, which is provided at the breakaway position 44a, may be selectively obviated to rotate the outer boom 28a to a transport position 50a.

While only a single embodiment of the present invention has been described in detail, it will be understood that the detailed description is intended to be illustrative only and that various modifications and changes may be made without departing from the spirit and scope of the present invention. Therefore the limits of the present invention should be determined from the attached claims.

What is claimed is:

1. A foldable boom assembly comprising:
   a support structure operatively connected to a prime mover;
   an inner boom having a first end that is operatively connected with said support structure and having a second end that is extendable outwardly with respect to said support structure;
   an outer boom having an inner end that is disposed proximal to said second end and having an outer end;
   hinge means, having an inner half that is attached to said inner boom proximal to said second end, and having an outer half that is attached to said outer boom proximal to said inner end and that is pivotally connected to said inner half, for permitting relative rotation of said booms about a pivot axis, and for allowing said outer boom to swing rearwardly from an outward position;
   urging means for resiliently urging said outer boom toward said outward position,
   stop means for limiting movement of said outer boom rearwardly from said outward position to a second position; and
   means for obviating said stop means, whereby said outer boom may be rotated rearwardly beyond said second position.

2. A foldable boom assembly as claimed in claim 1 in which said pivot axis is generally vertically disposed to provide said rearward swinging of said outer boom, and said pivot axis is inclined from vertical in a direction that causes said outer end of said outer boom to raise as said outer end of said outer boom swings rearwardly, and wherein said urging means for resiliently urging said outer boom toward said outward position comprises said inclination of said pivot axis and said raising of said outer boom as said outer boom swings rearwardly.

3. A foldable boom assembly as claimed in claim 1 in which said pivot axis includes upper and lower portions, and said inclination of said pivot axis comprises inclining said upper portion forwardly.

4. A foldable boom assembly as claimed in claim 1 in which said pivot axis includes upper and lower portions, and said inclination of said pivot axis comprises inclining said upper portion outwardly.

5. A foldable boom assembly as claimed in claim 1 in which said assembly includes detent means for yieldably retaining said outer boom in said outward position.

6. A foldable boom assembly comprising:
   a support structure operatively connected to a prime mover;
   an inner boom having a first end that is attached to said support structure and having a second end that is extendable outwardly with respect to said support structure;
   an outer boom having an inner end that is disposed proximal to said second end and having an outer end;
   an inner hinge half being attached to said inner boom proximal to said second end;
   an outer hinge half being attached to said outer boom proximal to said inner end;
   a hinge pin being disposed generally vertically and pivotally connecting said hinge halves, whereby said outer boom is pivoted about a generally vertical pivot axis and is pivotal in a generally horizontal plane;
   first stop means for preventing said outer boom from pivoting forwardly beyond an outward position;
   second stop means for preventing said outer boom from pivoting rearwardly beyond a second position;
   raising means, being responsive to rearward movement of said outer boom from said outward position toward said second position, for raising said outer boom against gravity, whereby said gravity resiliently urges said outer boom toward said outward position;
   said hinge pin and said pivot axis thereof being inclined from vertical in a direction that causes said outer boom to raise as said outer boom swings rearwardly, whereby said raising means comprises said inclination of said pivot axis;
   one of said hinge halves including a stop surface;
   the other of said hinge halves including a stop portion that abuts said stop surface when said outer boom reaches said second position; and
   said second stop means comprising said stop surface and said stop portion 7. A foldable boom assembly as claimed in claim 6 in which said pivot axis includes upper and lower portions, and said inclination of said pivot axis comprises inclining said upper portion forwardly.

8. A foldable boom assembly as claimed in claim 6 in which said pivot axis includes upper and lower portions, and said inclination of said pivot axis comprises inclining said upper portion outwardly.

9. A foldable boom assembly as claimed in claim 6 in which said assembly includes detent means for yieldably retaining said outer boom in said outward position.

10. A foldable boom assembly as claimed in claim 6 in which said outer hinge half is movable upwardly along said pivot axis with respect to said inner hinge half from a lower or gravity position to an upper position wherein said stop portion misses contacting said stop surface when said outer boom rotates rearwardly, whereby said outer boom is rotatably rearwardly beyond said second position when said outer boom and said outer hinge half are raised to said upper position.

11. A foldable boom assembly as claimed in claim 10 in which said one hinge half includes hole means, for receiving said stop portion therethrough when said outer hinge half is raised to said upper position and said outer boom is rotated beyond said second position.

12. A foldable boom assembly as claimed in claim 10 in which said outer boom is positioned substantially rearwardly at said second position, and said outer boom is rotatable to a third position wherein said outer end of said outer boom is proximal to said first end of said inner boom when said outer hinge half is raised.

13. A boom assembly comprising:
   a support structure operatively connected with a prime mover;

a boom having inner and outer ends and being disposed with said outer end extending outwardly with respect to said support structure to an outward position;

hinge means, having an inner half that is operatively connected with said support structure, and having an outer half that is attached to said boom proximal to said inner end and that is pivotally connected to said inner half, for establishing a generally vertical pivot axis, and for allowing said outer end of said boom to swing rearwardly from said outward position;

urging means for resiliently urging said outer end toward said outward position;

stop means for limiting said rearward swinging of said outer end to a second position; and obviating means for obviating said stop means, whereby said outer end may be swung rearwardly to a third position.

14. A boom assembly as claimed in claim 13 in which said stop means comprises a stop portion on one of said hinge halves and a stop surface on the other of said hinge halves; and said obviating means comprises raising said boom and said outer hinge half to a position wherein said stop portion misses said stop surface.

15. A boom assembly as claimed in claim 14 in which said other hinge half includes a hole being displaced vertically with respect to said stop surface; and said obviating means includes said hole.

16. A foldable boom assembly as claimed in claim 13 in which said urging means includes an inclination of said pivot axis from vertical.

* * * * *